(12) United States Patent
Graham

(10) Patent No.: US 11,275,063 B2
(45) Date of Patent: Mar. 15, 2022

(54) FRITS FOR CHROMATOGRAPHY

(71) Applicant: IDEX Health & Science LLC, Oak Harbor, WA (US)

(72) Inventor: Craig Graham, Anacortes, WA (US)

(73) Assignee: IDEX HEALTH & SCIENCE LLC, Oak Harbor, WA (US)

(*) Notice: Subject to any disclaimer, the term of this patent is extended or adjusted under 35 U.S.C. 154(b) by 231 days.

(21) Appl. No.: 14/716,658

(22) Filed: May 19, 2015

(65) Prior Publication Data

US 2015/0338383 A1 Nov. 26, 2015

Related U.S. Application Data

(60) Provisional application No. 62/000,731, filed on May 20, 2014.

(51) Int. Cl.
| | | |
|---|---|---|
| *G01N 30/60* | (2006.01) | |
| *B01D 15/12* | (2006.01) | |
| *B01D 29/56* | (2006.01) | |
| *B23K 26/20* | (2014.01) | |
| *B23K 26/38* | (2014.01) | |

(52) U.S. Cl.
CPC ......... *G01N 30/603* (2013.01); *B01D 15/125* (2013.01); *B01D 29/56* (2013.01); *B23K 26/20* (2013.01); *B23K 26/38* (2013.01); *Y10T 29/49828* (2015.01)

(58) Field of Classification Search
CPC ........... G01N 30/603; G01N 2030/521; G01N 2030/525; B01J 20/3035; B01J 20/28092; B01J 20/3078; B01D 24/001; B01D 27/005; B01D 15/125; B01D 29/56; B23K 26/20; B23K 26/38; Y10T 29/49828

See application file for complete search history.

(56) References Cited

U.S. PATENT DOCUMENTS

| | | | |
|---|---|---|---|
| 2,819,209 A | 1/1958 | Ball et al. | |
| 4,350,590 A | 9/1982 | Robinson | |
| 4,889,626 A | 12/1989 | Browne | |
| 5,320,811 A | 6/1994 | Mount et al. | |
| 5,472,598 A | 12/1995 | Schick | |
| 5,651,931 A | 7/1997 | Bailey et al. | |
| 5,922,166 A | 7/1999 | Dillon | |
| 6,478,969 B2 | 11/2002 | Brantley et al. | |
| 7,144,502 B2 | 12/2006 | Fermier et al. | |
| 7,311,502 B2 | 12/2007 | Gerhardt et al. | |
| 8,173,070 B2 | 5/2012 | Gerhardt et al. | |
| 2005/0260381 A1 | 11/2005 | Ditter et al. | |
| 2013/0001145 A1 | 1/2013 | Yin et al. | |
| 2014/0021116 A1 | 1/2014 | Ford et al. | |
| 2014/0260534 A1* | 9/2014 | Hahn | B01D 15/08 73/23.35 |

OTHER PUBLICATIONS

International Search Report dated Sep. 30, 2015.

* cited by examiner

*Primary Examiner* — Justin N Olamit
(74) *Attorney, Agent, or Firm* — Kilpatrick Townsend & Stockton LLP

(57) ABSTRACT

Frits for use in analytical instrument systems, including liquid chromatography systems, particularly HPLC and UHPLC systems, and methods of making and using the frits, are provided. The frits can have multiple layers, which may have different surface finishes on different surfaces.

19 Claims, 14 Drawing Sheets

FRITS FOR CHROMATOGRAPHY

CROSS-REFERENCE TO RELATED APPLICATION

This application claims benefit of priority of U.S. Provisional No. 62/000,731 filed May 20, 2014, the entire disclosure of which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This disclosure relates generally to frits for use in ion chromatography, liquid chromatography and other analytical systems, including in particular high pressure and ultrahigh pressure liquid chromatography systems, as well as methods for making and using such fits.

2. Description of the Related Art

Liquid chromatography (LC) and ion chromatography (IC) are well-known techniques for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase.

In a conventional LC system, the sample and mobile phase pass through one or more filters and often a guard column before coming to the column. A typical column usually consists of a piece of tubing which has been packed with a "packing" material. The "packing" consists of the particulate material "packed" inside the column. It usually consists of silica- or polymer-based particles, which are often chemically bonded with a chemical functionality. When the sample is carried through the column (along with the mobile phase), the various components in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

The particle sizes of chromatographic packing materials used in HPLC columns have been decreasing over time. The trend is clearly toward packing materials with smaller particle sizes. Adequate retention of the chromatographic packing material is imperative to the mechanical stability of the column and the integrity of the HPLC system. It is particularly important when separation conditions demand very high column efficiencies. In order to achieve high efficiency in a minimal amount of time, the smallest possible particle size packings are desirable. The HPLC system's extra column tubing volume must be minimized in order not to detract from the efficiency performance of the column. This requires the use of very small diameter connection tubing, which can be easily plugged by particles if they are not well retained within the HPLC column.

Once the sample (with its components now separated) leaves the column, it flows with the mobile phase past a detector. The detector detects the presence of specific molecules or compounds. Two general types of detectors are used in LC applications. One type measures a change in some overall physical property of the mobile phase and the sample (such as their refractive index). The other type measures only some property of the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample. Additionally, LC systems may utilize mass spectrometric detection for identification and quantification of the sample, either in addition to, or as an alternative to, the conventional detectors described previously. Ion chromatography relies on the detection of ions in solution, so most metallic materials in the flow path can create interference in the detection scheme, as they create background ions.

In addition to the above components, a LC system will often include filters or frits, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column. Thus, filters or flits can be used in various components of an LC system, including, but not limited to, a column, such as a primary and/or guard column, a cross, a tee, and a union, to name but a few. For example, in U.S. Pat. No. 5,651,931, a biocompatible filter or frit, as well as a method of making such a filter or frit, is described for use in an LC system.

In practice, various components in an LC system may be connected by an operator to perform a given task. For example, an operator will select an appropriate mobile phase and column, and then connect a supply of the selected mobile phase and a selected column to the LC system before operation. In order to be suitable for high performance liquid chromatography (HPLC) applications, each connection must be able to withstand the typical operating pressures of the HPLC system. If the connection is too weak, it may leak.

Because the types of solvents that are sometimes used as the mobile phase are often toxic and because it is often expensive to obtain and/or prepare many samples for use, any such connection failure is a serious concern.

It is fairly common for an operator to disconnect a column (or other component) from a LC system and then connect a different column (or other component) in its place after one test has finished and before the next begins. Given the importance of leak-proof connections, especially in HPLC applications, the operator must take time to be sure the connection is sufficient. Replacing a column (or other component) may occur several times in a day. Moreover, the time involved in disconnecting and then connecting a column (or other component) is unproductive because the LC system is not in use and the operator is engaged in plumbing the system instead of preparing samples or other more productive activities. Hence, the replacement of a column in a conventional LC system involves a great deal of wasted time and inefficiencies.

Given concerns about the need for leak-free connections, conventional connections have been made with stainless steel tubing and stainless steel end fittings. More recently, however, it has been realized that the use of stainless steel components in a LC system have potential drawbacks in situations involving biological samples, and cannot be routinely used for ion chromatography. For example, the components in a sample may attach themselves to the wall of stainless steel tubing. This presents problems because the detector's measurements (and thus the chromatogram) of a given sample may not accurately reflect the sample if some of the sample's components or ions remain in the tubing and do not pass the detector. Perhaps of even greater concern, however, is the fact that ions from the stainless steel tubing may detach from the tubing and flow past the detector, thus leading to potentially erroneous results. Hence, there is a need for "biocompatible" or "metal-free" connections through the use of a material that is chemically inert with respect to such "biological" samples and the mobile phase used with such samples, so that ions will not be released by the tubing and thus contaminate the sample.

In many applications using selector/injector valves to direct fluid flows, and in particular in liquid chromatography, the volume of fluids is small. This is particularly true when liquid chromatography is being used as an analytical method as opposed to a preparative method. Such methods often use capillary columns and are generally referred to as capillary chromatography. In capillary chromatography, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques, for example, historically often involved samples of about one microliter to about 100 milliliters in volume. Thus, the micro-fluidic techniques described herein involve volumes one or more orders of magnitude smaller in size than traditional LC techniques. Micro-fluidic techniques can also be expressed as those involving fluid flow rates of about 0.5 ml/minute or less.

Most conventional HPLC systems include pumps which can generate relatively high pressures of up to around 5,000 psi to 6,000 psi or so. In many situations, an operator can obtain successful results by operating a LC system at "low" pressures of anywhere from just a few psi or so up to 1,000 psi or so. More often than not, however, an operator will find it desirable to operate a LC system at relatively "higher" pressures of over 1,000 psi.

Another, relatively newer liquid chromatography form is Ultra High Performance Liquid Chromatography (UHPLC) in which system pressure extends upward to 1400 bar or 20,000 psi. Both HPLC and UHPLC are examples of analytical instrumentation that utilize fluid transfer at elevated pressures. For example, in U.S. Pat. No. 8,173,070, an injection system is described for use with UHPLC applications, which are said to involve pressures in the range from 20,000 psi to 120,000 psi. In U.S. Pat. No. 7,311,502, the use of a hydraulic amplifier is described for use in UHPLC systems involving pressures in excess of 25,000 psi. In U.S. Pat. No. 7,144,502, a system for performing UHPLC is disclosed, with UHPLC described as involving pressures above 5,000 psi (and up to 60,000 psi). Applicants hereby incorporate by reference as if fully set forth herein U.S. Pat. Nos. 7,311,502, 8,173,070 and 7,144,502.

As noted, liquid chromatography (as well as other analytical) systems, including HPLC or UHPLC systems, typically include several components. For example, a system may include a pump; an injection valve or autosampler for injecting the analyte; a precolumn filter to remove particulate matter in the analyte solution that might clog the column; a packed bed to retain irreversibly adsorbed chemical material; the HPLC column itself; and a detector that analyzes the carrier fluid as it leaves the column. Ion chromatography may also utilize a suppressor column to facilitate detection dynamic range. These various components may typically be connected by a miniature fluid conduit, or tubing, such as metallic or polymeric tubing (for ion chromatography), usually having an internal diameter of 0.003 to 0.040 inch.

It will be understood by those skilled in the art that, as used herein, the term "LC system" is intended in its broad sense to include all apparatus and components in a system used in connection with liquid chromatography, whether made of only a few simple components or made of numerous, sophisticated components which are computer controlled or the like. Those skilled in the art will also appreciate that an LC system is one type of an analytical instrument (AI) system. For example, gas chromatography is similar in many respects to liquid chromatography, but obviously involves a gas sample to be analyzed. Although the following discussion focuses on liquid chromatography, those skilled in the art will appreciate that much of what is said also has application to other types of AI systems and methods.

Therefore, it is an object of the present disclosure to provide a liquid chromatography frit, and particularly a biocompatible liquid chromatography frit, for use in a liquid chromatography or an ion chromatography system.

It is another object of the present disclosure to provide a high pressure liquid chromatography frit, and particularly a biocompatible high pressure liquid chromatography frit, for use in a HPLC or an UHPLC system.

It is a further object of the present disclosure to provide a high pressure liquid chromatography frit that can be used at pressures up to about 18,000 pounds per square inch ("psi") or more.

It is an additional object of the present disclosure to provide liquid chromatography fits, and particularly high pressure liquid chromatography frits, that can provide a variety of filtration levels, including 0.5, 2, 5, 10 and 20 micron ratings, and that reduce bead blow-by.

It is yet another object of the present disclosure to provide liquid chromatography frits, and particularly high pressure liquid chromatography frits, that envelop comparable to existing fits, and require less inspection than currently existing frits.

It is still another object of the present disclosure to provide liquid chromatography frits, and particularly high pressure liquid chromatography frits, that realize a pressure drop that is less than existing frits.

It is another object of the present disclosure to provide liquid chromatography flits, and particularly high pressure liquid chromatography frits, that have a lifetime that is greater than existing frits.

It is a further object of the present disclosure to provide liquid chromatography frits, and particularly high pressure liquid chromatography fits, that cost less than existing flits.

The above and other advantages of the present disclosure will become readily apparent to those skilled in the art from the following detailed description of the present disclosure, and from the attached drawings, which are briefly described below.

SUMMARY OF THE INVENTION

The present disclosure overcomes one or more of the deficiencies of the prior art by providing flits that are well-suited for use in liquid chromatography systems, and are particularly well-suited for use in high pressure and ultra high pressure liquid chromatography systems, such as HPLC and UHPLC.

The present disclosure provides a frit for use in a liquid chromatography system, comprising at least a first layer of a first film and at least a second layer of a second film, wherein the first film and the second film each have a first side having a first finish and a second side having a second finish, and wherein the at least a first layer of the first film and the at least a second layer of the second film are oriented such that the first side of the at least a second layer of the second film is positioned against the second side of the at least a first layer of the first film, and wherein the at least a second layer of the second film defines a channel from the first side of the at least a second layer of the second film to the second side of the at least a second layer of the second film. In certain embodiments the first film and the second film are the same, while in other embodiments the first film and the second film are different. In particular embodiments at least a portion of the first finish comprises a matte finish. In such embodiments the matte finish can have an Ra value of between about 25 µ-in and about 70 µ-in, between about 30 µ-in and about 65 µ-in, between about 35 µ-in and about 60 µ-in, between about 40 µ-in and about 55 µ-in, or between about 45 µ-in and about 50 µ-in. Thus, in some embodiments the matte finish has an Ra value of about 25 µ-in, about 30 µ-in, about 35 µ-in, about 40 µ-in, about 45 µ-in, about 50 µ-in, about 55 µ-in, about 60 µ-in, about 65 µ-in, or about 70 µ-in. In other embodiments the matte finish can have an Rz value of between about 150 µ-in and about 360 µ-in, between about 175 µ-in and about 350 µ-in, between about 200 µ-in and about 325 µ-in, between about 225 µ-in and about 300 µ-in, or between about 250 µ-in and about 275 µ-in. Therefore, in particular embodiments the matte finish has an Rz value of about 150 µ-in, about 160 µ-in, about 170 µ-in, about 175 µ-in, about 180 µ-in, about 190 µ-in, about 200 µ-in, about 210 µ-in, about 220 µ-in, about 225 µ-in, about 230 µ-in, about 240 µ-in, about 250 µ-in, about 260 µ-in, about 270 µ-in, about 275 µ-in, about 280 µ-in, about 290 µ-in, about 300 µ-in, about 310 µ-in, about 320 µ-in, about 325 µ-in, about 330 µ-in, about 340 µ-in, about 350 µ-in, or about 360 µ-in. In further embodiments the matte finish is substantially random or non-uniform. In still other embodiments the matte finish has a lay to it. In further embodiments at least a portion of the second finish comprises a matte finish.

In alternative embodiments at least a portion of the second finish is a gloss finish. In such embodiments the gloss finish can have an Ra value of between about 0.5 µ-in and about 3.0 µ-in, between about 0.75 µ-in and about 2.75 µ-in, between about 1.0 µ-in and about 2.5 µ-in, between about 1.25 µ-in and about 2.25 µ-in, or between about 1.5 µ-in and about 2.0 µ-in. Thus in particular embodiments the gloss finish has an Ra value of about 0.5 µ-in, about 0.6 µ-in, about 0.7 µ-in, about 0.75 µ-in, about 0.8 µ-in, about 0.9 µ-in, about 1.0 On, about 1.1 µ-in, about 1.2 µ-in, about 1.25 µ-in, about 1.3 µ-in, about 1.4 µ-in, about 1.5 µ-in, about 1.6 µ-in, about 1.7 µ-in, about 1.75 µ-in, about 1.8 µ-in, about 1.9 µ-in, about 2.0 µ-in, about 2.1 µ-in, about 2.2 µ-in, about 2.25 µ-in, about 2.3 µ-in, about 2.4 µ-in, about 2.5 µ-in, about 2.6 µ-in, about 2.7 µ-in, about 2.75 µ-in, about 2.8 µ-in, about 2.9 µ-in, or about 3.0 µ-in. In other embodiments the gloss finish can have an Rz value of between about 5 µ-in and about 30 µ-in, between about 7.5 µ-in and about 27.5 µ-in, between about 10 µ-in and about 25 µ-in, between about 12.5 µ-in and about 22.5 µ-in, or between about 15 µ-in and about 20 µ-in. Therefore in some embodiments the gloss finish has an Rz value of about 5 µ-in, about 6 µ-in, about 7 µ-in, about 7.5 µ-in, about 8 µ-in, about 9 µ-in, about 10 µ-in, about 11 µ-in, about 12 µ-in, about 12.5 µ-in, about 13 µ-in, about 14 µ-in, about 15 µ-in, about 16 µ-in, about 17 µ-in, about 17.5 µ-in, about 18 µ-in, about 19 µ-in, about 20 µ-in, about 21 µ-in, about 22 µ-in, about 22.5 µ-in, about 23 µ-in, about 24 µ-in, about 25 µ-in, about 26 µ-in, about 27 µ-in, about 27.5 µ-in, about 28 µ-in, about 29 µ-in, or about 30 µ-in.

In further embodiments the first film or the second film comprises a biocompatible material. In yet further embodiments the first film and the second film comprises a biocompatible material. In other embodiments the first film or the second film comprises polyetheretherketone. In certain embodiments the first film and the second film have a thickness of between about 25 µm and about 250 µm, between about 50 µm and about 225 µm, between about 75 µm and about 200 µm, between about 100 µm and about 175 µm, or between about 125 µm and about 150 µm. In particular embodiments the first film and the second film have a thickness of about 25 µm, about 50 µm, about 75 µm, about 100 µm, about 125 µm, about 150 µm, about 175 µm, about 200 µm, about 225 µm, or about 250 µm.

In various embodiments, the presently disclosed frits can have any number of layers. Thus, in certain embodiments the frit further comprises at least a third layer of a third film having a first side having a first finish and a second side having a second finish, oriented such that the first side of the at least a third layer of the third film is positioned against the second side of the at least a second layer of the second film, and wherein the at least a third layer of the third film defines a channel from the first side of the at least a third layer of the third film to the second side of the at least a third layer of the third film. In some embodiments the first film, the second film and the third film are the same. In further embodiments the frit further comprises at least a fourth layer of a fourth film having a first side having a first finish and a second side having a second finish, oriented such that the first side of the at least a fourth layer of the fourth film is positioned against the second side of the at least a third layer of the third film, and wherein the at least a fourth layer of the fourth film defines a channel from the first side of the at least a fourth layer of the fourth film to the second side of the at least a fourth layer of the fourth film. In certain embodiments the first film, the second film, the third film and the fourth film are the same. In yet further embodiments the frit further comprises at least a fifth layer of a fifth film having a first side having a first finish and a second side having a second finish, oriented such that the first side of the at least a fifth layer of the fifth film is positioned against the second side of the at least a fourth layer of the fourth film, and wherein the at least a fifth layer of the fifth film defines a channel from the first side of the at least a fifth layer of the fifth film to the second side of the at least a fifth layer of the fifth film. In particular embodiments the first film, the second film, the third film, the fourth film and the fifth film are the same. In other embodiments the frit further comprises at least a sixth layer of a sixth film having a first side having a first finish and a second side having a second finish, oriented such that the first side of the at least a sixth layer of the sixth film is positioned against the second side of the at least a fifth layer of the fifth film, and wherein the at least a sixth layer of the sixth film defines a channel from the first side of the at least a sixth layer of the sixth film to the second side of the at least a sixth layer of the sixth film. In some embodiments the first film, the second film, the third film, the fourth film, the fifth film and the sixth film are the same. In yet other embodiments the frit further comprises at least a seventh layer of a seventh film having a first side having a first finish and a second side having a second finish, oriented such that the first side of the at least a seventh layer of the seventh film is positioned against the second side of the at least a sixth layer of the sixth film, and wherein the at least a seventh layer of the seventh film defines a channel from the first side of the at least a seventh layer of the seventh film to the second side of the at least a seventh layer of the seventh film. In certain embodiments the first film, the second film, the third film, the fourth film, the fifth film, the sixth film and the seventh film are the same.

In various embodiments the frit has a thickness of between about 0.02 inches and about 0.08 inches, between about 0.03 inches and about 0.07 inches, or between about 0.04 inches and about 0.06 inches. Thus in particular embodiments the frit has a thickness of about 0.02 inches, about 0.03 inches, about 0.04 inches, about 0.05 inches, about 0.06 inches, about 0.07 inches, or about 0.08 inches. In some embodiments the first side of the at least a first layer of the first film defines at least a first fluid path. In other embodiments the at least a first layer of the first film defines a channel from the first side of the at least a first layer of the first film to the second side of the at least a first layer of the first film. Although the disclosed frits can be of any desired shape for any particular application, in certain embodiments the frit comprises a circular shape. In some embodiments the frit has an adjustable micron rating, and in other embodiments the fit can be cleaned by decompression during a back flush operation.

The present disclosure also provides an analytical instrument system comprising at least one frit comprising at least a first layer of a first film and at least a second layer of a second film, wherein the first film and the second film each have a first side having a first finish and a second side having a second finish, and wherein the at least a first layer of the first film and the at least a second layer of the second film are oriented such that the first side of the at least a second layer of the second film is positioned against the second side of the at least a first layer of the first film, and wherein the at least a second layer of the second film defines a channel from the first side of the at least a second layer of the second film to the second side of the at least a second layer of the second film. In certain embodiments the first film and the second film are the same. In particular embodiments the analytical instrument system comprises an ultra high pressure or ultra high performance liquid chromatography or ion chromatography system.

The present disclosure additionally provides a method of making a frit for use in a liquid chromatography system, comprising attaching at least a first layer of a first film to at least a second layer of a second film, wherein the first film and the second film each have a first side having a first finish and a second side having a second finish, and wherein the at least a first layer of the first film and the at least a second layer of the second film are oriented such that the first side of the at least a second layer of the second film is positioned against the second side of the at least a first layer of the first film, and providing a channel from the first side of the at least a second layer of the second film to the second side of the at least a second layer of the second film. In certain embodiments the first film and the second film are the same. In some embodiments the step of attaching the at least a first layer of the first film to the at least a second layer of the film uses laser welding, compression or encapsulation. In other embodiments the step of providing a channel uses drilling, punching, laser cutting, water jet cutting or machining. In particular embodiments at least a portion of the first finish comprises a matte finish. In further embodiments the matte finish is substantially random or non-uniform, and such a substantially random or non-uniform matte finish can be produced by a shot peen, bead blast or powder blast process. In alternative embodiments the matte finish has a lay to it, and such a matte finish with a lay to it can be produced by a grinding process. In additional embodiments at least a portion of the second finish comprises a matte finish. In other embodiments at least a portion of the second finish comprises a gloss finish. In certain embodiments the first side of the at least a first layer of the first film defines at least a first fluid path, an in such embodiments the at least a first fluid path can be produced by embossing, stamping, forming, molding, machining, or cutting.

The present disclosure further provides a frit for use in a liquid chromatography system, comprising a central porous region surrounded by an outer solid region. In certain embodiments the central porous region is shorter than the outer solid region in a direction of fluid flow through the frit. In some embodiments the central porous region is between about 0.005 inches to about 0.03 inches shorter than the outer solid region, between about 0.005 inches to about 0.03 inches shorter than the outer solid region, between about 0.006 inches to about 0.02 inches shorter than the outer solid region, between about 0.007 inches to about 0.01 inches shorter than the outer solid region, or between about 0.008 inches to about 0.009 inches shorter than the outer solid region, in the direction of fluid flow through the frit. Thus in particular embodiments the central porous region is about 0.005 inches shorter than the outer solid region, about 0.006 inches shorter than the outer solid region, about 0.007 inches shorter than the outer solid region, about 0.008 inches shorter than the outer solid region, about 0.009 inches shorter than the outer solid region, about 0.01 inches shorter than the outer solid region, about 0.011 inches shorter than the outer solid region, about 0.012 inches shorter than the outer solid region, about 0.013 inches shorter than the outer solid region, about 0.014 inches shorter than the outer solid region, about 0.015 inches shorter than the outer solid region, about 0.016 inches shorter than the outer solid region, about 0.017 inches shorter than the outer solid region, about 0.018 inches shorter than the outer solid region, about 0.019 inches shorter than the outer solid region, about 0.02 inches shorter than the outer solid region, about 0.021 inches shorter than the outer solid region, about 0.022 inches shorter than the outer solid region, about 0.023 inches shorter than the outer solid region, about 0.024 inches shorter than the outer solid region, about 0.025 inches shorter than the outer solid region, about 0.026 inches shorter than the outer solid region, about 0.027 inches shorter than the outer solid region, about 0.028 inches shorter than the outer solid region, about 0.029 inches shorter than the outer solid region, or about 0.03 inches shorter than the outer solid region, in the direction of fluid flow through the frit.

In additional embodiments the frit comprises a biocompatible material. In some embodiments the frit comprises polyetheretherketone. In various embodiments the frit has a thickness of between about 0.03 inches and about 0.1 inches, between about 0.04 inches and about 0.09 inches, between about 0.05 inches and about 0.08 inches, or between about 0.06 inches and about 0.07 inches. Thus, in particular embodiments the frit has a thickness of about 0.03 inches, about 0.04 inches, about 0.05 inches, about 0.06 inches, about 0.07 inches, about 0.08 inches, about 0.09 inches, or about 0.1 inches.

The present disclosure also provides an analytical instrument system comprising at least one fit comprising a central porous region surrounded by an outer solid region. In certain embodiments the central porous region is shorter than the outer solid region in a direction of fluid flow through the frit. In other embodiments the analytical instrument system comprises an ultra high pressure or ultra high performance liquid chromatography or ion chromatography system.

The present disclosure further provides a method of making a frit for use in a liquid chromatography system, comprising placing a porous material into a press, wherein a first portion of the press comes into contact with a central portion of the porous material and a second portion of the press comes into contact with an outer portion of the porous material, and wherein the first portion of the press extends further than the second portion of the press, operating the press for at least a first time to compress the porous material, resulting in a central portion of the porous material that is shorter than the outer portion of the porous material, further pressing the outer portion of the porous material to increase the density of the outer portion of the porous material, and heating the outer portion of the porous material to solidify the porous material in the outer portion, thereby creating a frit comprising a porous central portion and a solid outer portion, wherein the porous central region is shorter than the solid outer portion in a direction of fluid flow through the frit.

These and other embodiments and advantages of the disclosed frits are described below.

DETAILED DESCRIPTION

Figure 1:
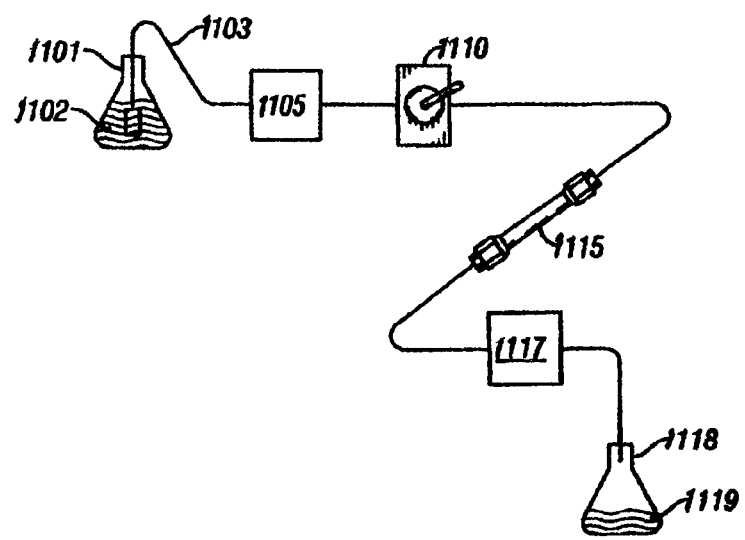
FIG. 1 is a block diagram of a conventional liquid chromatography system.

In FIG. 1, a block diagram of the essential elements of a conventional liquid chromatography (LC) system is provided. A reservoir 1101 contains a solvent or mobile phase 1102. Tubing 1103 connects the mobile phase 1102 in the reservoir 1101 to a pump 1105. The pump 1105 is connected to a sample injection valve 1110 which, in turn, is connected via tubing to a first end of a guard column (not shown). The second end of the guard column (not shown) is in turn connected to the first end of a primary column 1115. The second end of the primary column 1115 is then connected via tubing to a detector 1117. After passing through the detector 1117, the mobile phase 1102 and the sample injected via injection valve 1110 are expended into a second reservoir 1118, which contains the chemical waste 1119. As noted above, the sample injection valve 1110 is used to inject a sample of a material to be studied into the LC system. The mobile phase 1102 flows through the tubing 1103 which is used to connect the various elements of the LC system together.

When the sample is injected via sample injection valve 1110 in the LC system, the sample is carried by the mobile phase through the tubing into the column 1115. As is well known in the art, the column 1115 contains a packing material which acts to separate the constituent elements of the sample. After exiting the column 1115, the sample (as separated via the column 1115) then is carried to and enters a detector 1117, which detects the presence or absence of various chemicals. The information obtained by the detector 1117 can then be stored and used by an operator of the LC system to determine the constituent elements of the sample injected into the LC system. Those skilled in the art will appreciate that FIG. 1 and the foregoing discussion provide only a brief overview of a simplistic LC system that is conventional and well-known in the art, as is shown and described in U.S. Pat. No. 5,472,598, issued Dec. 5, 1995 to Schick, which is hereby incorporated by reference as if fully set forth herein. Those skilled in the art will also appreciate that while the discussion herein focuses on a LC system, other analytical systems can be used in connection with various embodiments of the present disclosure, such as a mass spectrometry, microflow chromatography, nanoflow chromatography, nano-scale liquid chromatography, capillary electrophoresis, or reverse-phase gradient chromatography system.

Preferably, for an LC system to be biocompatible, the various components (except where otherwise noted) that may come into contact with the effluent or sample to be analyzed are made of the synthetic polymer polyetheretherketone, which is commercially available under the trademark PEEK™ from VICTREX®. The polymer PEEK has the advantage of providing a high degree of chemical inertness and therefore biocompatibility; it is chemically inert to most of the common solvents used in LC applications, such as acetone, acetonitrile, and methanol (to name a few). PEEK also can be machined by standard machining techniques to provide smooth surfaces. Those skilled in the art will appreciate that other polymers may be desirable in certain applications.

Figure 2:
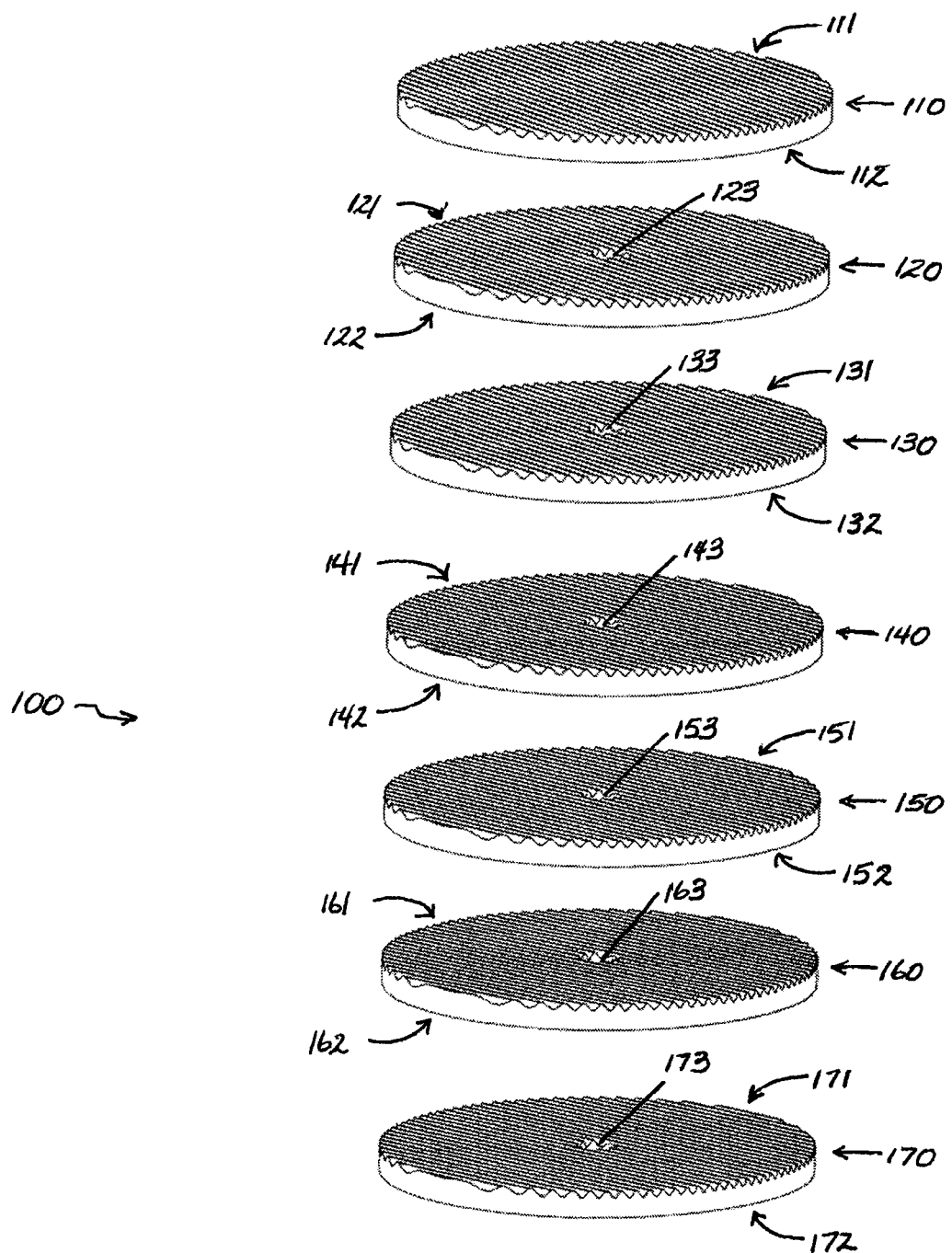
FIG. 2 is a top exploded view of an embodiment of a frit in accordance with one aspect of the present disclosure.

Referring now to FIG. 2, an exploded view of a first embodiment of frit 100 is shown. Frit 100 as shown in FIG. 2 is preferably generally circular and symmetric about a center axis, although in other embodiments (not shown) frit 100 can be any desired shape, including, but not limited to, oval, square, or triangular, just to name a few. Frit 100 comprises a plurality of layers, which in the embodiment shown in FIG. 2 comprises seven layers. First layer 110 of the frit 100 is a solid layer having a matte finish on the top surface 111 of the first layer 110 and a gloss finish on the bottom surface 112 of the first layer 110. Second layer 120 of the frit 100 has a matte finish on the top surface 121 of the second layer 120 and a gloss finish on the bottom surface 122 of the second layer 120, and also defines a passageway 123 through the second layer 120 from the top surface 121 to the bottom surface 122 of the second layer 120. Third layer 130 of the frit 100 has a matte finish on the top surface 131 of the third layer 130 and a gloss finish on the bottom surface 132 of the third layer 130, and also defines a passageway 133 through the third layer 130 from the top surface 131 to the bottom surface 132 of the third layer 130. Fourth layer 140 of the frit 100 has a matte finish on the top surface 141 of the fourth layer 140 and a gloss finish on the bottom surface 142 of the fourth layer 140, and also defines a passageway 143 through the fourth layer 140 from the top surface 141 to the bottom surface 142 of the fourth layer 140. Fifth layer 150 of the frit 100 has a matte finish on the top surface 151 of the fifth layer 150 and a gloss finish on the bottom surface 152 of the fifth layer 150, and also defines a passageway 153 through the fifth layer 150 from the top surface 151 to the bottom surface 152 of the fifth layer 150. Sixth layer 160 of the frit 100 has a matte finish on the top surface 161 of the sixth layer 160 and a gloss finish on the bottom surface 162 of the sixth layer 160, and also defines a passageway 163 through the sixth layer 160 from the top surface 161 to the bottom surface 162 of the sixth layer 160. Seventh layer 170 of the frit 100 has a matte finish on the top surface 171 of the seventh layer 170 and a gloss finish on the bottom surface 172 of the seventh layer 170, and also defines a passageway 173 through the seventh layer 170 from the top surface 171 to the bottom surface 172 of the seventh layer 170. The matte finish on the top surfaces (111, 121, 131, 141, 151, 161 and 171) can either be a random or non-uniform (non-directional) finish created from a process such as, but not limited to, shot peen, bead blast or powder blast), have a surface finish with a lay to it (a directional finish as a consequence of creating the surface finish with a process such as, but not limited to, grinding), or a mixture thereof (some layers having a random or non-uniform matte finish, others having a matte finish with a lay to it).

By orienting the top (matte) surfaces (121, 131, 141, 151, 161 and 171) of the second layer 120, third layer 130, fourth layer 140, fifth layer 150, sixth layer 160 and seventh layer 170, respectively, of frit 100 against the bottom (gloss) surfaces (112, 122, 132, 142, 152, and 162) of the first layer 110, second layer 120, third layer 130, fourth layer 140, fifth layer 150 and sixth layer 160, respectively, of frit 100, gaps (not shown) are created that serve as tortuous fluid channels. Fluid is forced between the layers, which filters out particulate that is greater in size than the tortuous fluid channels that are created.

Figure 3:
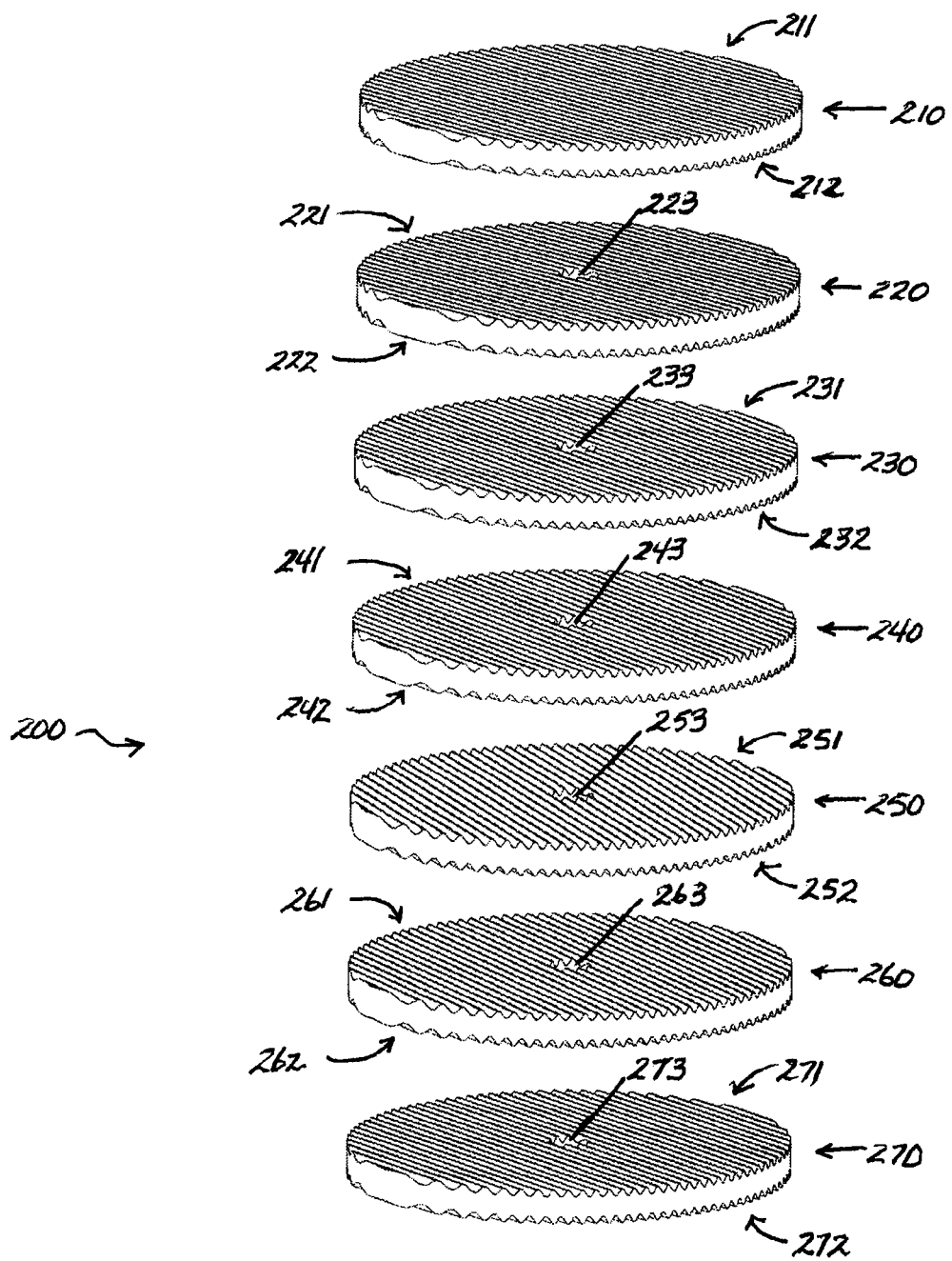
FIG. 3 is a top exploded view of an embodiment of a frit in accordance with another aspect of the present disclosure.

Referring now to FIG. 3, an exploded view of an embodiment of another frit 200 is shown. Frit 200 is similar to frit 100 shown in FIG. 2, except that both the top surface and the bottom surface of each of the layers of frit 200 have a matte finish. Once again, frit 200 as shown in FIG. 3 is preferably generally circular and symmetric about a center axis. Frit 200 comprises a plurality of layers, which in the embodiment shown in FIG. 3 comprises seven layers. First layer 210 of the fit 200 is a solid layer having a matte finish on the top surface 211 of the first layer 210 and a matte finish on the bottom surface 212 of the first layer 210. Second layer 220 of the frit 200 has a matte finish on the top surface 221 of the second layer 220 and a matte finish on the bottom surface 222 of the second layer 220, and also defines a passageway 223 through the second layer 220 from the top surface 221 to the bottom surface 222 of the second layer 220. Third layer 230 of the frit 200 has a matte finish on the top surface 231 of the third layer 230 and a matte finish on the bottom surface 232 of the third layer 230, and also defines a passageway 233 through the third layer 230 from the top surface 231 to the bottom surface 232 of the third layer 230. Fourth layer 240 of the frit 200 has a matte finish on the top surface 241 of the fourth layer 240 and a matte finish on the bottom surface 242 of the fourth layer 240, and also defines a passageway 243 through the fourth layer 240 from the top surface 241 to the bottom surface 242 of the fourth layer 240. Fifth layer 250 of the frit 200 has a matte finish on the top surface 251 of the fifth layer 250 and a matte finish on the bottom surface 252 of the fifth layer 250, and also defines a passageway 253 through the fifth layer 250 from the top surface 251 to the bottom surface 252 of the fifth layer 250. Sixth layer 260 of the frit 200 has a matte finish on the top surface 261 of the sixth layer 260 and a matte finish on the bottom surface 262 of the sixth layer 260, and also defines a passageway 263 through the sixth layer 260 from the top surface 261 to the bottom surface 262 of the sixth layer 260. Seventh layer 270 of the frit 200 has a matte finish on the top surface 271 of the seventh layer 270 and a matte finish on the bottom surface 272 of the seventh layer 270, and also defines a passageway 273 through the seventh layer 270 from the top surface 271 to the bottom surface 272 of the seventh layer 270. The matte top surfaces (211, 221, 231, 241, 251, 261 and 271) and bottom surfaces (212, 222, 232, 242, 252, 262 and 272) can either be a random or non-uniform (non-directional) finish created from a process such as, but not limited to, shot peen, bead blast or powder blast), have a surface finish with a lay to it (a directional finish as a consequence of creating the surface finish with a process such as, but not limited to, grinding), or a mixture thereof (some layers having a random or non-uniform matte finish, others having a matte finish with a lay to it). In certain embodiments, the frits can have a combination of one or more layers that have one surface (top or bottom) with a random or non-uniform matte finish and the other surface (top or bottom) with a matte finish with a lay to it.

In frit 200, gaps (not shown) are once again created between the layers, which serve as tortuous fluid channels. Fluid is forced between the layers, which filters out particulates that are greater in size than the tortuous fluid channels that are created. Although not shown, frits of the present disclosure also include those with a combination of one or more layers having a top surface with a matte finish and a bottom surface having a gloss finish, and one or more layers having a top and bottom surface with a matte finish.

While a variety of different polymeric materials or metals can be used to produce the presently disclosed frits, an exemplary material that is commercially available and can be used to produce the presently disclosed frits is a film made from polyetheretherketone (PEEK), which is created with a matte finish on one side and a gloss finish on the other side (known as APTIV® PEEK film sold by Victrex® plc, Lancashire, Great Britain). Thus one embodiment of the presently disclosed frits can be produced by orienting layers of APTIV® PEEK film with the top (matte) surfaces against the bottom (gloss) surfaces, and welding, compressing or encapsulating the layers together to produce the tortuous fluid channels. In addition to PEEK, other polymer materials that may be used in the frits of the present disclosure include, but are not limited to, TEFLON®, TEFZEL®, DELRIN®, polyphenylene sulfide (PPS), polypropylene, and others, as well as combinations thereof. In addition, PEEK (or other polymers) may be used that is reinforced with carbon, carbon fibers, glass fibers, or steel fibers, or the like.

Figure 4:
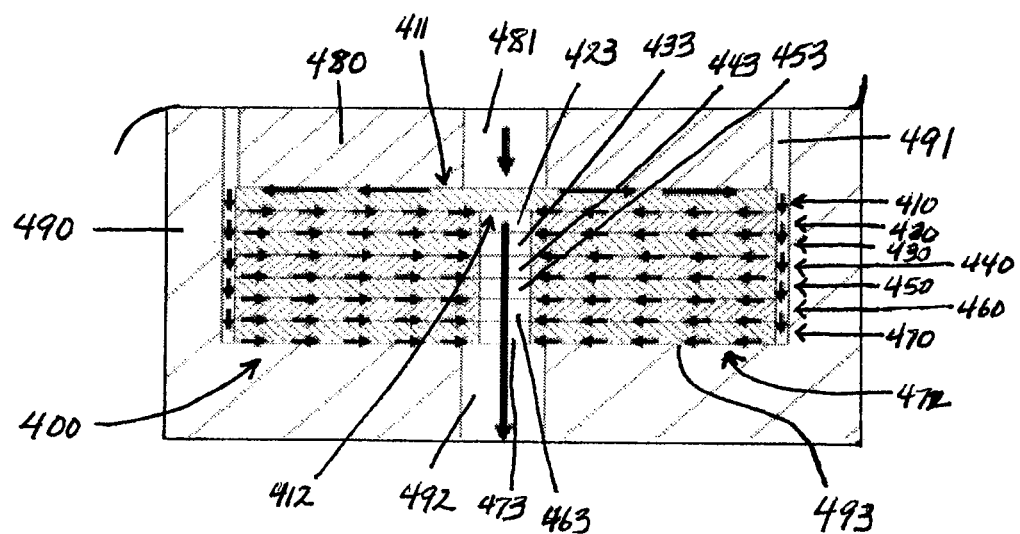
FIG. 4 is a cross-sectional view of the frit of FIG. 2 or FIG. 3 at the end of a section of tubing and engaged in a port, showing fluid flow through the frit.

FIG. 4 shows a frit 400 engaged at one end of a tube 480 in a port 490, with fluid flow designated by arrows. Frit 400 can be a frit such as those shown in FIG. 2 or FIG. 3, but is shown without top and/or bottom surface features for ease of viewing. Frit 400 once again comprises seven layers, first layer 410, having a top surface 411 and a bottom surface 412, second layer 420, having a top surface and a bottom surface (not discernable in FIG. 4) and defining a passageway 423, third layer 430, having a top surface and a bottom surface (not discernable in FIG. 4) and defining a passageway 433, fourth layer 440, having a top surface and a bottom surface (not discernable in FIG. 4) and defining a passageway 443, fifth layer 450, having a top surface and a bottom surface (not discernable in FIG. 4) and defining a passageway 453, sixth layer 460, having a top surface and a bottom surface (not discernable in FIG. 4) and defining a passageway 463, and seventh layer 470, having a top surface (not discernable in FIG. 4) and a bottom surface 472, and defining a passageway 473. First layer 410 of frit 400 is adjacent tube 480, which defines a passageway 481. Fluid flows through passageway 481 of tube 480 and contacts top surface 411 of the first layer 410 of frit 400. Frit 400 is shown engaged in port 490 having port pocket 491, passageway 492 and port base 493. Bottom surface 472 of seventh layer 470 of frit 400 is shown to be engaged with port base 493 of port 490. Fluid flows along top surface 411 of the first layer 410 of the frit 400 to the port pocket 491, and then though the gaps (not shown) between the bottom surface 412 of the first layer 410 and the top surface (not discernable in FIG. 4) of the second layer 420, between the bottom surface (not discernable in FIG. 4) of the second layer 420 and the top surface (not discernable in FIG. 4) of the third layer 430, between the bottom surface (not discernable in FIG. 4) of the third layer 430 and the top surface (not discernable in FIG. 4) of the fourth layer 440, between the bottom surface (not discernable in FIG. 4) of the fourth layer 440 and the top surface (not discernable in FIG. 4) of the fifth layer 450, between the bottom surface (not discernable in FIG. 4) of the fifth layer 450 and the top surface (not discernable in FIG. 4) of the sixth layer 460, between the bottom surface (not discernable in FIG. 4) of the sixth layer 460 and the top surface (not discernable in FIG. 4) of the seventh layer 470, and between the bottom surface 472 and the port base 493, to the passageways of the layers (423, 433, 443, 453, 463 and 473), and then to the passageway 492 of the port 490.

Figure 5:
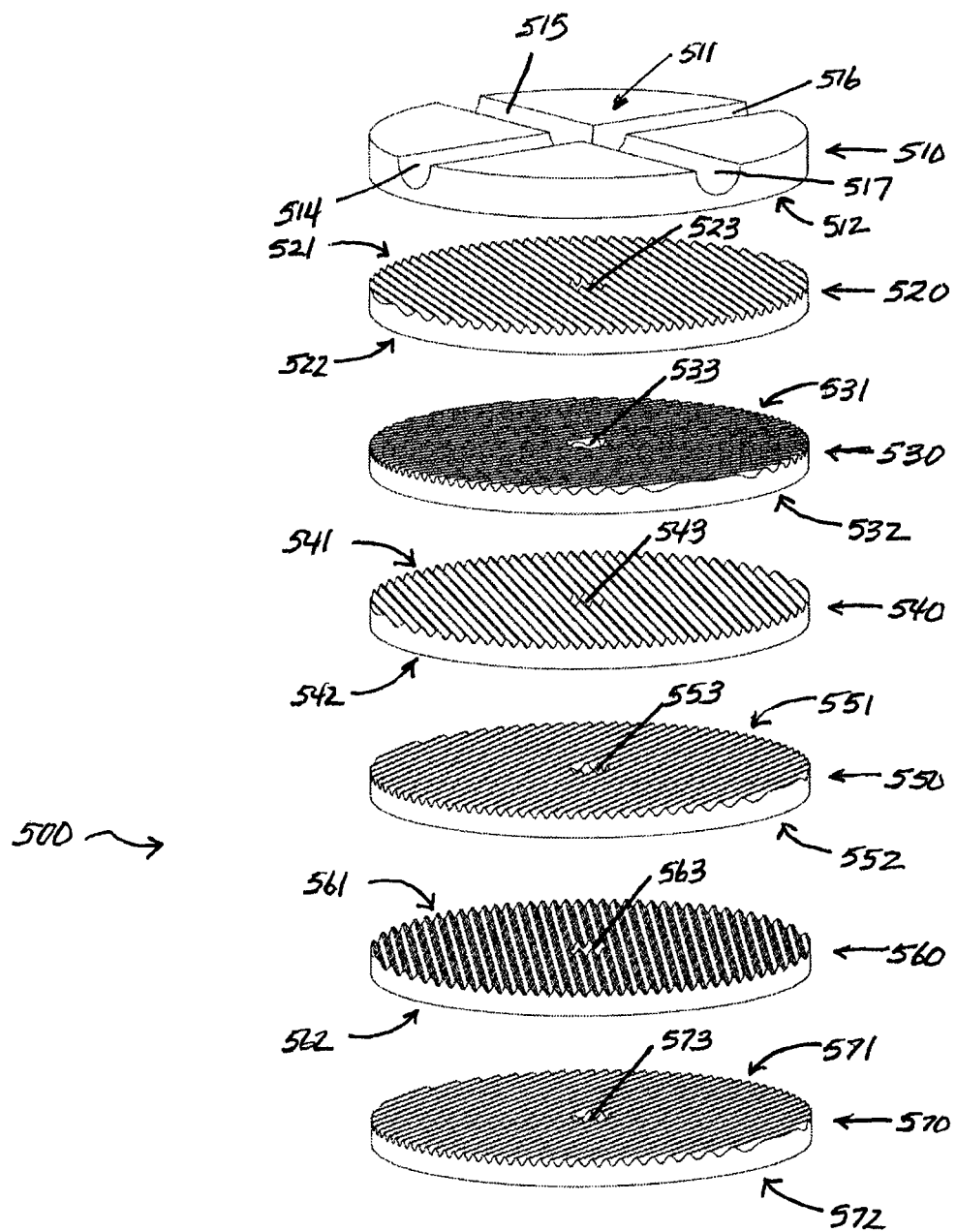
FIG. 5 is a top exploded view of an embodiment of a frit in accordance with a further aspect of the present disclosure.

Referring now to FIG. 5, an exploded view of an embodiment of another frit 500 is shown. Frit 500 as shown in FIG. 5 is preferably generally circular and symmetric about a center axis. Frit 500 comprises a plurality of layers, which in the embodiment shown in FIG. 5 comprises seven layers. First layer 510 of the frit 500 is a solid layer having a top surface 511 defining a plurality of fluid channels, which in the embodiment shown in FIG. 5 comprises a first fluid channel 514, a second fluid channel 515, a third fluid channel 516 and a fourth fluid channel 517, and a gloss finish on the bottom surface 512. Second layer 520 of the frit 500 has a matte finish on the top surface 521 and a gloss finish on the bottom surface 522, and also defines a passageway 523 through the second layer 520 from the top surface 521 to the bottom surface 522. Third layer 530 of the frit 500 has a matte finish on the top surface 531 and a gloss finish on the bottom surface 532, and also defines a passageway 533 through the third layer 530 from the top surface 531 to the bottom surface 532. Fourth layer 540 of the frit 500 has a matte finish on the top surface 541 and a gloss finish on the bottom surface 542, and also defines a passageway 543 through the fourth layer 540 from the top surface 541 to the bottom surface 542. Fifth layer 550 of the frit 500 has a matte finish on the top surface 551 and a gloss finish on the bottom surface 552, and also defines a passageway 553 through the fifth layer 550 from the top surface 551 to the bottom surface 552. Sixth layer 560 of the frit 500 has a matte finish on the top surface 561 and a gloss finish on the bottom surface 562, and also defines a passageway 563 through the sixth layer 560 from the top surface 561 to the bottom surface 562. Seventh layer 570 of the frit 500 has a matte finish on the top surface 571 and a gloss finish on the bottom surface 572, and also defines a passageway 573 through the seventh layer 570 from the top surface 571 to the bottom surface 572. Once again the matte top surfaces (521, 531, 541, 551, 561 and 571) can either be a random or non-uniform (non-directional) finish created from a process such as, but not limited to, shot peen, bead blast or powder blast), have a surface finish with a lay to it (a directional finish as a consequence of creating the surface finish with a process such as, but not limited to, grinding), or a mixture thereof (some layers having a random or non-uniform matte finish, others having a matte finish with a lay to it). In certain embodiments one or more layers (510, 520, 530, 540, 550, 560 and/or 570) of frit 500 can have a matte finish on the bottom surface (not shown).

Figure 6:
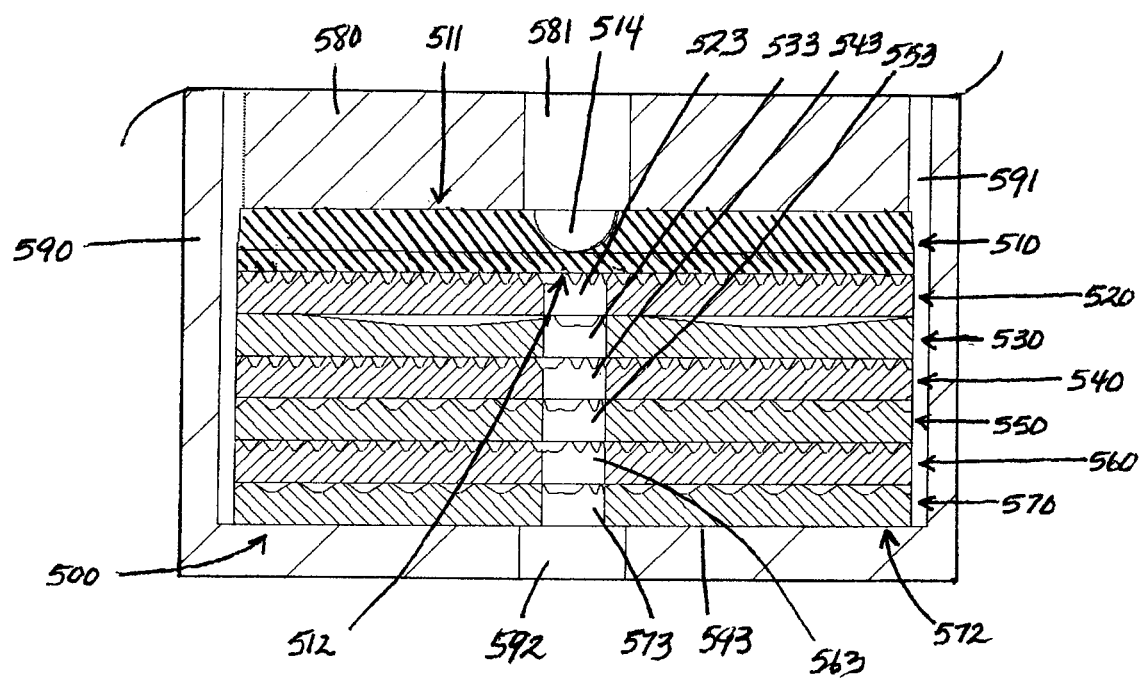
FIG. 6 is a cross-sectional view of the frit of FIG. 5 at the end of a section of tubing and engaged in a port.

FIG. 6 shows the frit 500 shown in FIG. 5 engaged at one end of a tube 580 in a port 590. Frit 500 once again comprises seven layers, first layer 510, having a top surface 511 defining four fluid channels (only fluid channel 514 is visible in FIG. 6) and a bottom surface 512, second layer 520, having a top surface and a bottom surface (not discernable in FIG. 6) and defining a passageway 523, third layer 530, having a top surface and a bottom surface (not discernable in FIG. 6) and defining a passageway 533, fourth layer 540, having a top surface and a bottom surface (not discernable in FIG. 6) and defining a passageway 543, fifth layer 550, having a top surface and a bottom surface (not discernable in FIG. 6) and defining a passageway 553, sixth layer 560, having a top surface and a bottom surface (not discernable in FIG. 6) and defining a passageway 563, and seventh layer 570, having a top surface (not discernable in FIG. 6) and a bottom surface 572, and defining a passageway 573. First layer 510 of frit 500 is adjacent tube 580, which defines a passageway 581. Frit 500 is shown engaged in port 590 having port pocket 591, passageway 592 and port base 593. Bottom surface 572 of seventh layer 570 of frit 500 is shown to be engaged with port base 593 of port 590.

Figure 7:
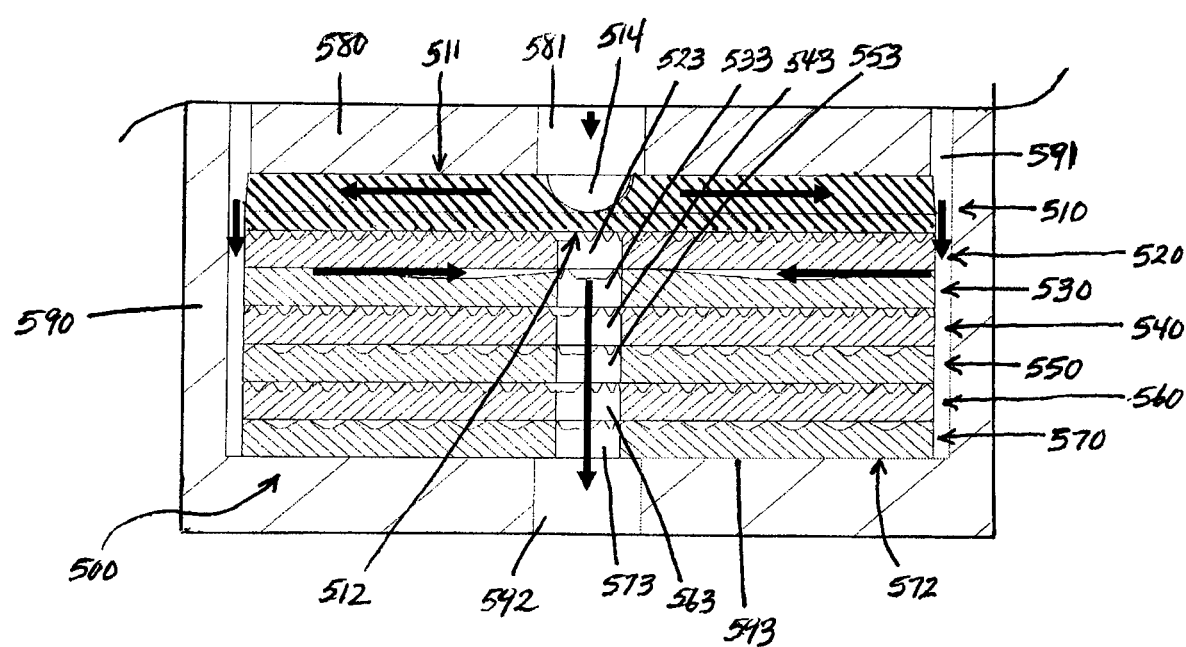
FIG. 7 is a cross-sectional view of the frit of FIG. 5 at the end of a section of tubing and engaged in a port, showing a partial diagram of fluid flow through the frit.

FIG. 7 shows the frit 500 from FIG. 5 engaged at one end of a tube 580 in a port 590, as shown in FIG. 6, with initial fluid flow designated by arrows. Frit 500 once again comprises seven layers, first layer 510, having a top surface 511 defining four fluid channels (only fluid channel 514 is visible in FIG. 7) and a bottom surface 512, second layer 520, having a top surface and a bottom surface (not discernable in FIG. 7) and defining a passageway 523, third layer 530, having a top surface and a bottom surface (not discernable in FIG. 7) and defining a passageway 533, fourth layer 540, having a top surface and a bottom surface (not discernable in FIG. 7) and defining a passageway 543, fifth layer 550, having a top surface and a bottom surface (not discernable in FIG. 7) and defining a passageway 553, sixth layer 560, having a top surface and a bottom surface (not discernable in FIG. 7) and defining a passageway 563, and seventh layer 570, having a top surface (not discernable in FIG. 7) and a bottom surface 572, and defining a passageway 573. First layer 510 of frit 500 is adjacent tube 580, which defines a passageway 581. Fluid flows through passageway 581 of tube 580 and contacts first fluid channel 514 in top surface 511 of the first layer 510 of frit 500. Frit 500 is shown engaged in port 590 having port pocket 591, passageway 592 and port base 593. Bottom surface 572 of seventh layer 570 of frit 500 is shown to be engaged with port base 593 of port 590. Fluid flows along fluid channels (including first fluid channel 514) in top surface 511 of the first layer 510 of the frit 500 to the port pocket 591, and then though the gaps (not shown) between the bottom surface 512 of the first layer 510 and the top surface (not discernable in FIG. 7) of the second layer 520, between the bottom surface (not discernable in FIG. 7) of the second layer 520 and the top surface (not discernable in FIG. 7) of the third layer 530, between the bottom surface (not discernable in FIG. 7) of the third layer 530 and the top surface (not discernable in FIG. 7) of the fourth layer 540, between the bottom surface (not discernable in FIG. 7) of the fourth layer 540 and the top surface (not discernable in FIG. 7) of the fifth layer 550, between the bottom surface (not discernable in FIG. 7) of the fifth layer 550 and the top surface (not discernable in FIG. 7) of the sixth layer 560, between the bottom surface (not discernable in FIG. 7) of the sixth layer 560 and the top surface (not discernable in FIG. 7) of the seventh layer 570, and between the bottom surface 572 and the port base 593, to the passageways of the layers (523, 533, 543, 553, 563 and 573), and then to the passageway 592 of the port 590.

Figure 8:
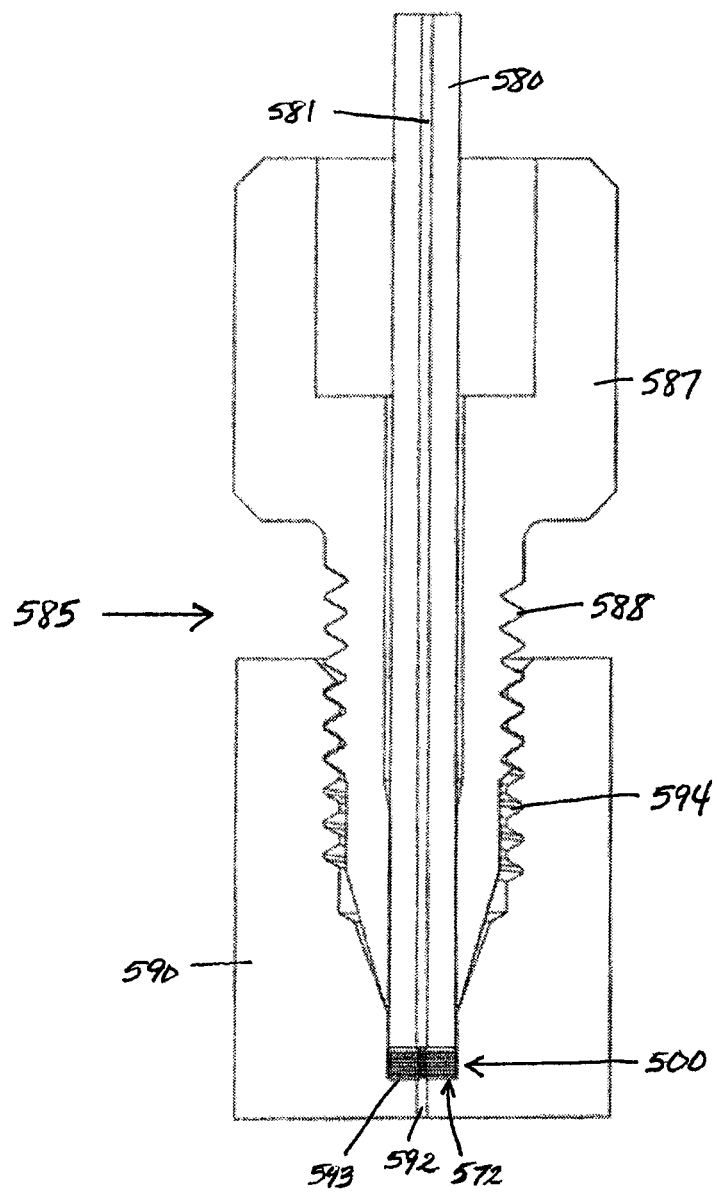
FIG. 8 is a cross-sectional view of a fitting assembly, tube and the frit of FIG. 5 engaged in a port.

FIG. 8 shows the frit 500 from FIG. 5 engaged at one end of a tube 580 disposed in a fitting 585 that is engaged in a port 590. Tube 580, which defines a passageway 581, is disposed in passageway 586 of fitting 585, which also comprises head portion 587 and externally threaded portion 588. Externally threaded portion 588 of fitting 585 is threadedly engaged with internally threaded portion 594 of port 590, which once again has port pocket (not discernable in FIG. 8), passageway 592 and port base 593. Bottom surface 572 of seventh layer (not discernable in FIG. 8) of frit 500 is shown to be engaged with port base 593 of port 590.

Figure 9:
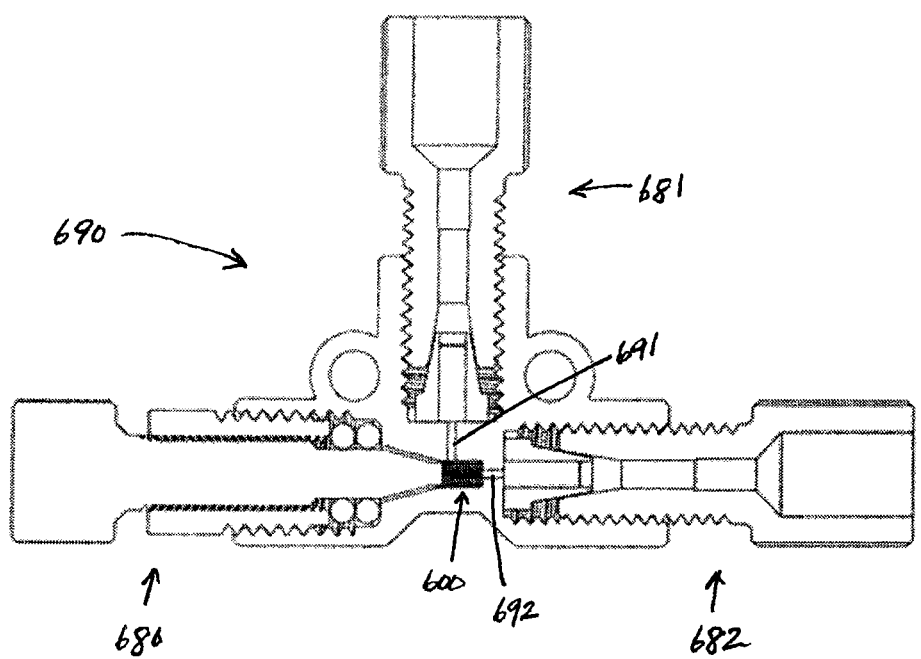
FIG. 9 is a cross-sectional view of a tee connection assembly and a frit in accordance with an additional aspect of the present disclosure.

FIG. 9 shows an alternative embodiment of a frit 600 engaged in a tee connection assembly 690, defining a first passageway 691 and a second passageway 692. Shown engaged in tee connection assembly 690 are fittings 680, 681 and 682. Since frit 600 does not have a solid top layer, fluid flow in frit 600 is from the inner region of frit 600 to the outer region of frit 600.

Figure 10:
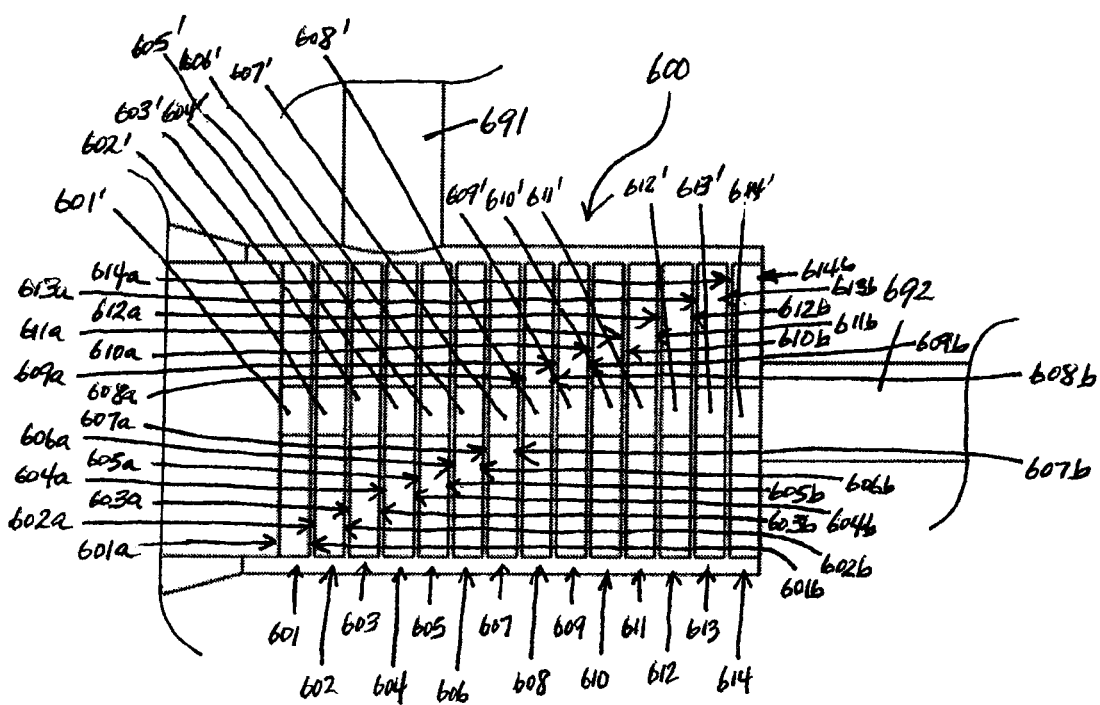
FIG. 10 is a cross-sectional view of the frit from the tee connection assembly and frit of FIG. 9.

Some additional details of the frit 600 from FIG. 9 are shown in FIG. 10. Frit 600 has a plurality of layers, which in the embodiment shown in FIG. 10 comprises fourteen layers (601, 602, 603, 604, 605, 606, 607, 608, 609, 610, 611, 612, 613 and 614), each of which has a top surface (601a, 602a, 603a, 604a, 605a, 606a, 607a, 608a, 609a, 610a, 611a, 612a, 613a and 614a, respectively), a bottom surface (601b, 602b, 603b, 604b, 605b, 606b, 607b, 608b, 609b, 610b, 611b, 612b, 613b and 614b, respectively), and defines a passageway (601', 602', 603', 604', 605', 606', 607', 608', 609', 610', 611', 612', 613' and 614', respectively). Frit 600 is shown without top and/or bottom surface features for ease of viewing. The top surfaces (601a, 602a, 603a, 604a, 605a, 606a, 607a, 608a, 609a, 610a, 611a, 612a, 613a and 614a) generally have a matte finish, while the bottom surfaces (601b, 602b, 603b, 604b, 605b, 606b, 607b, 608b, 609b, 610b, 611b, 612b, 613b and 614b) can have either a gloss finish or a matte finish, and the matte surfaces can either be a random or non-uniform (non-directional) finish created from a process such as, but not limited to, shot peen, bead blast or powder blast), have a surface finish with a lay to it (a directional finish as a consequence of creating the surface finish with a process such as, but not limited to, grinding), or a mixture thereof (some layers having a random or non-uniform matte finish, others having a matte finish with a lay to it). In certain embodiments, the fits can have a combination of one or more layers that have a bottom surface with a gloss finish and one or more layers that have a matte finish, while in other embodiments the flits can have a combination of one or more layers that have one surface (top or bottom) with a random or non-uniform matte finish and the other surface (top or bottom) with a matte finish with a lay to it.

Figure 11:
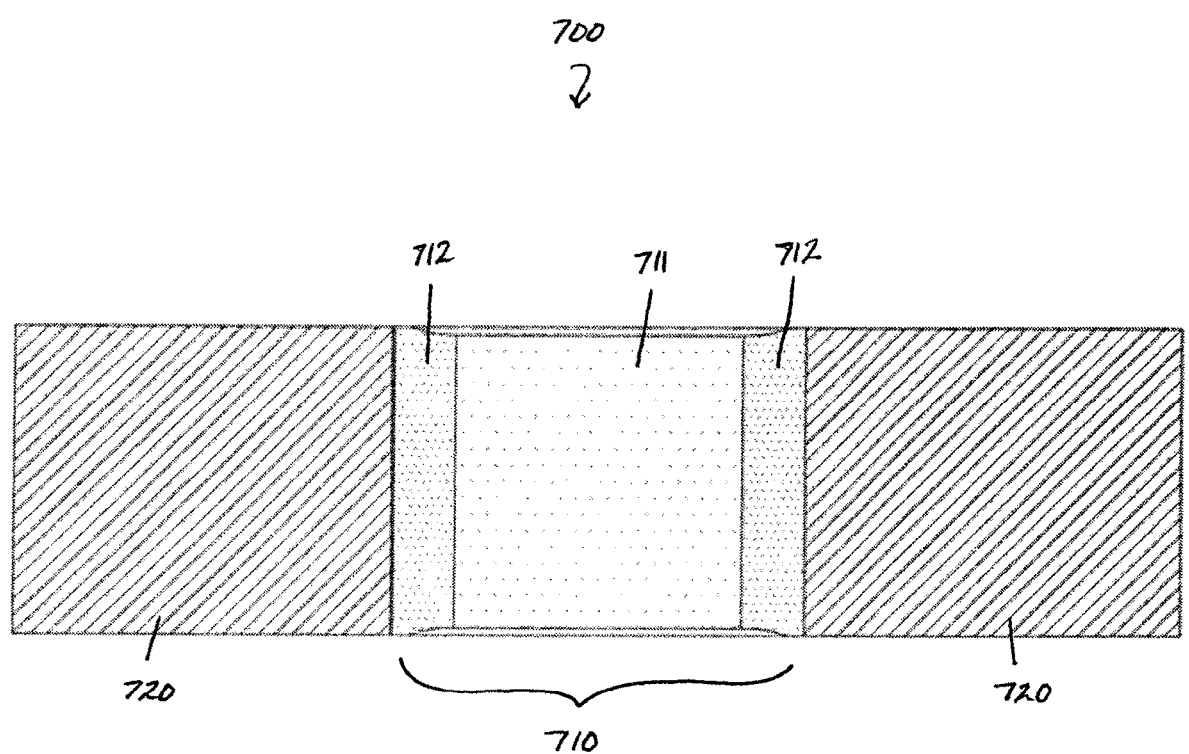
FIG. 11 is a cross-sectional view of an embodiment of a frit in accordance with yet another aspect of the present disclosure.

FIG. 11 shows an alternative embodiment of a frit 700. Frit 700 comprises a central porous region 710 and a solid outer region 720. As shown in FIG. 11, the central porous region 710 is shorter than the solid outer region 720 of the frit 700. In addition, central porous region 710 comprises interior area 711 and exterior area 712. The exterior area 712 of the central porous region 710 is an intermixed area of solid and porous, since there is generally not a definite border between the solid outer region 720 and the central porous region 710 (thus there is a non-tortuous path for the beads to migrate through). The solid outer region 720 is integral to the frit 700 without an interface. The solid outer region 720 serves as a barrier to encapsulate the central porous region 710, as well as a surface to seal against.

Figure 12:
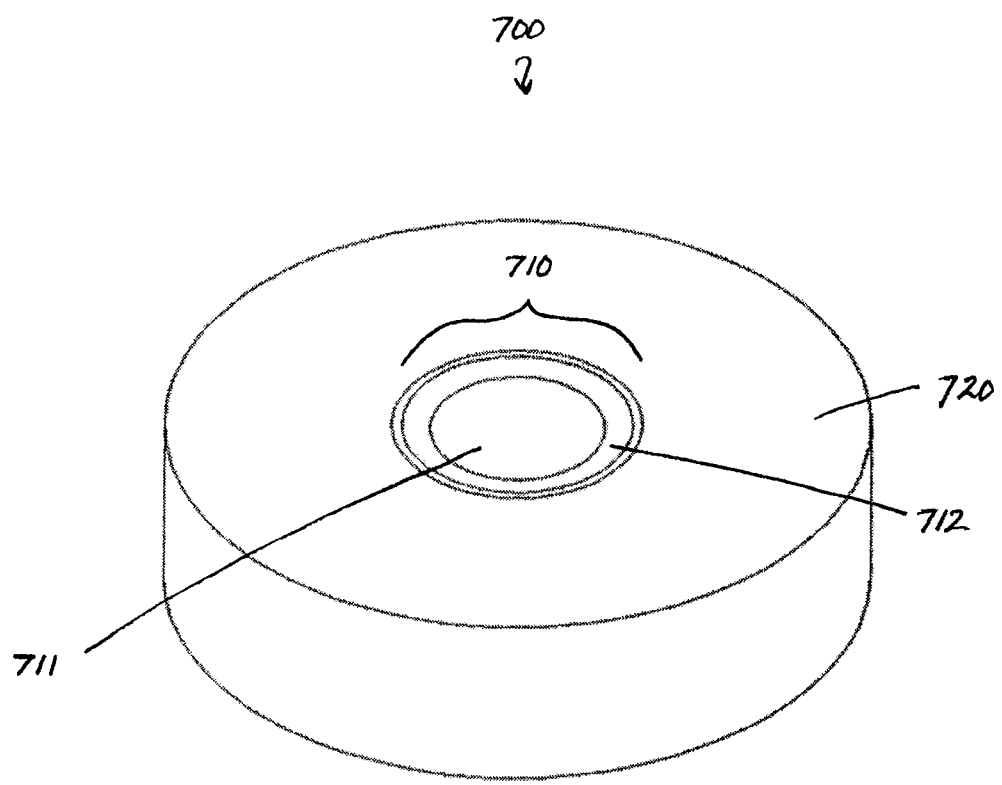
FIG. 12 is a front top perspective view of the frit of FIG. 11.

FIG. 12 shows a front top perspective view of the alternative embodiment of frit 700 shown in FIG. 11. Once again, frit 700 comprises a central porous region 710 having an interior area 711 and an exterior area 712, and a solid outer region 720.

Figure 13:
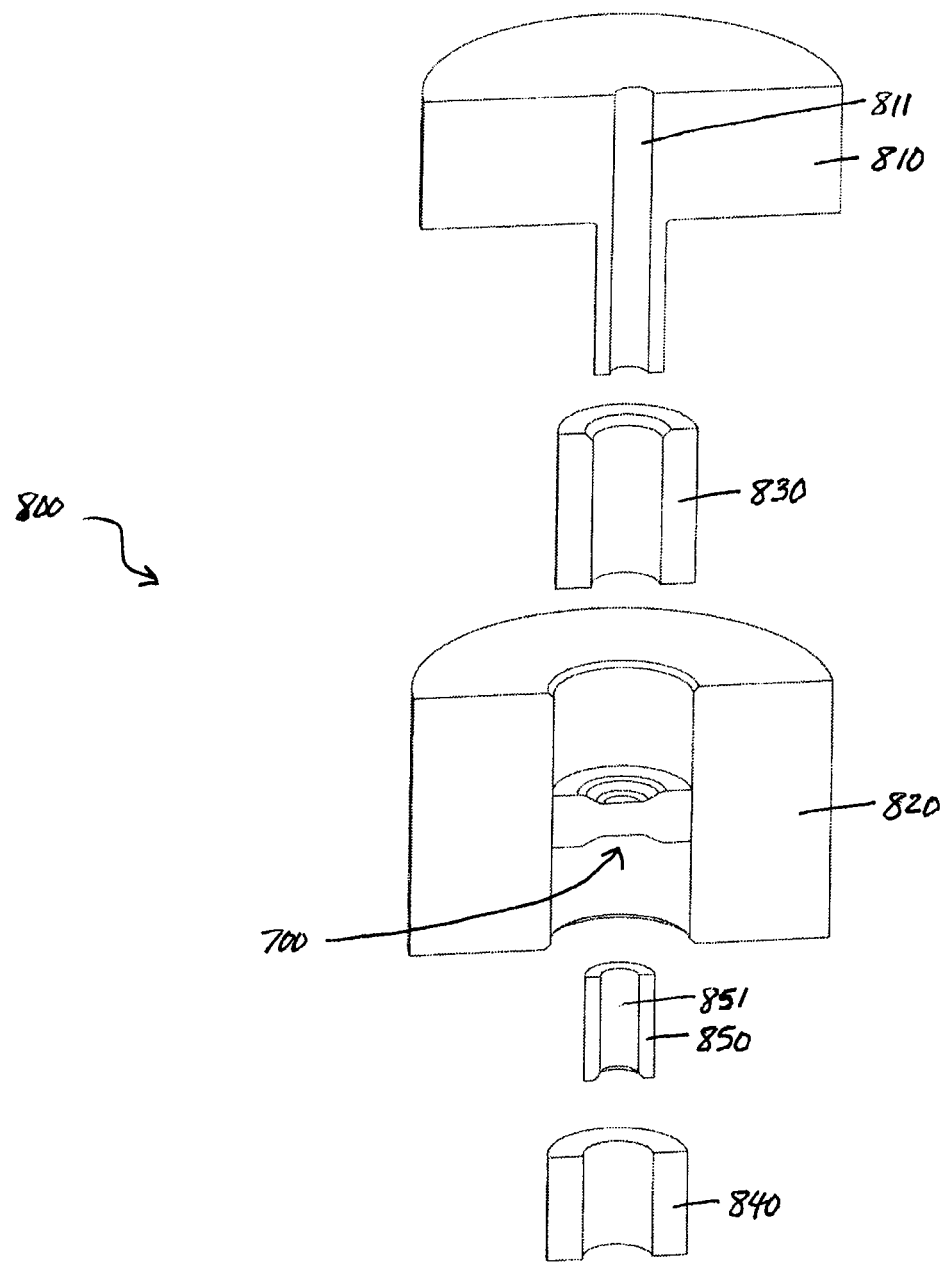
FIG. 13 is an exploded top perspective view of a device that can be used to form the frit of FIG. 11.

FIG. 13 shows a top perspective cross-sectional exploded view of one embodiment of a device 800 that can be used to prepare the alternative embodiment of frit 700 shown in FIG. 11 and FIG. 12. Device 800 comprises a press head 810 with no environmental heat that defines a passageway 811, a base 820 that can be heated, for example by using an induction coil, inserts 830 and 840, that can also be heated, for example by using an induction coil, and spacer 850 that defines passageway 851.

Figure 14:
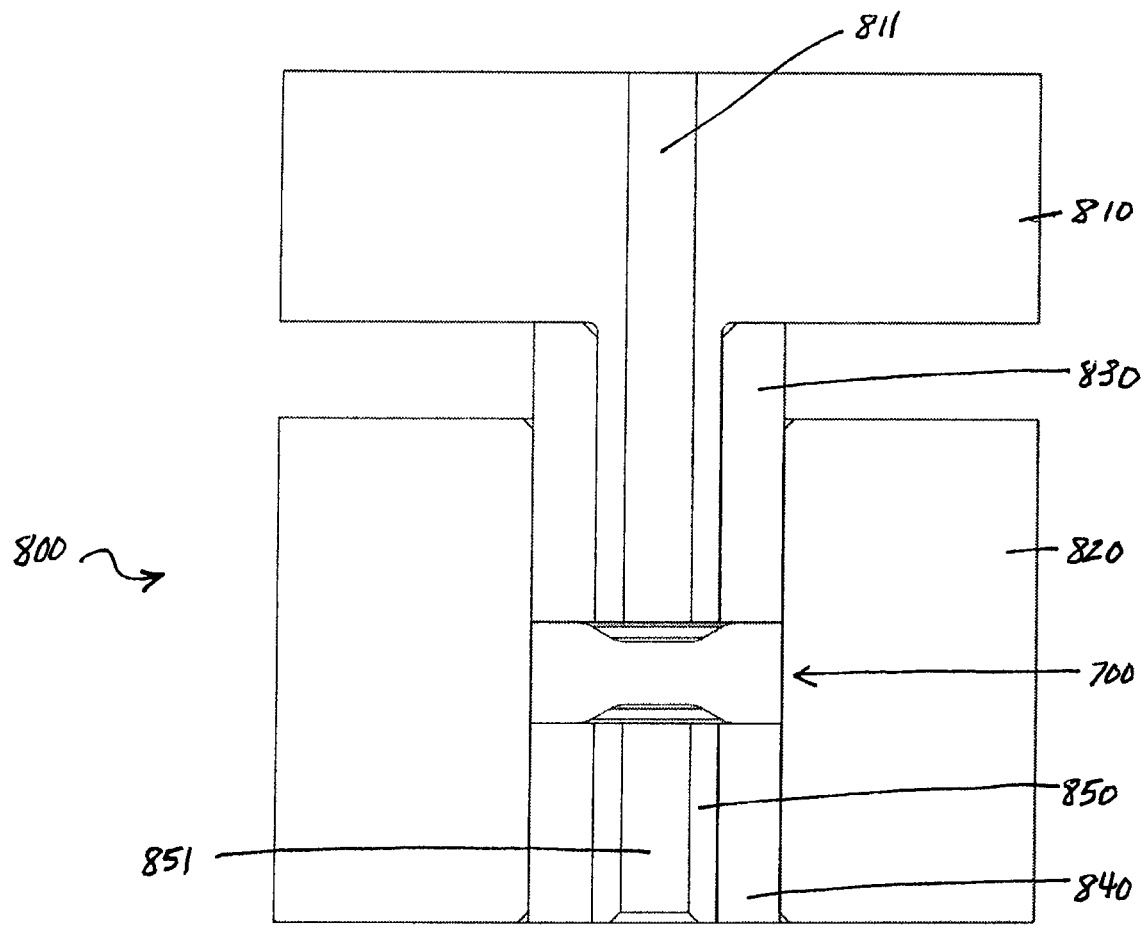
FIG. 14 is a cross-sectional view of the device of FIG. 13 upon assembly.

FIG. 14 shows a cross-sectional view of the device 800 shown in FIG. 13 upon assembly. Device 800 once again comprises a press head 810 with no environmental heat that defines a passageway 811, a base 820 that can be heated, for example by using an induction coil, inserts 830 and 840, that can also be heated, for example by using an induction coil, and spacer 850 that defines passageway 851. Frit 700 can prepared by pressing the starting polymeric material in device 800 (or alternatively can be prepared by pressing with a set of tools, not shown), and then heating base 820 and inserts 830 and 840 to melt and thus solidify the polymeric material in solid outer region 820. Since the press head 810 has no environmental heat, the polymeric material in central porous region of frit 700 does not melt and solidify and therefore remains porous. In certain embodiments compressed air or gas, or a liquid such as water, an aqueous solution or alcohol, can flow through passageways 811 and 851 to extract heat and keep the central porous region 810 cool.

The following examples are included to demonstrate preferred embodiments of the present disclosure. It should be appreciated by those of skill in the art that the techniques disclosed in the examples that follow represent techniques discovered by the inventors to function well in the practice of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the present disclosure. The present disclosure is not to be limited in scope by the specific embodiments described herein, which are intended as single illustrations of individual aspects of the present disclosure, and functionally equivalent methods and components are within the scope of the present disclosure. Indeed, various modifications of the present disclosure, in addition to those shown and described herein, will become apparent to those skilled in the art from the foregoing description. Such modifications are intended to fall within the scope of the appended claims.

Example 1

Performance of a frit as described herein was tested. This test comprised of stacking 48 rectangular shaped strips of 250 μm (0.010 inch) thick by 0.010 inches wide by 0.500 inches long PEEK film, matte finish on one side, gloss on the other. For surface finish measurement of the film, see Table 1.

TABLE 1

| Matte Finish | | Gloss Finish | |
| --- | --- | --- | --- |
| Ra (μ-in) | Rz (μ-in) | Ra (μ-in) | Rz (μ-in) |
| 48 | 273 | 1 | 10 |
| 53 | 339 | 1 | 9 |
| 54 | 332 | 2 | 20 |
| 47 | 285 | 2 | 13 |
| 46 | 241 | 1 | 11 |
| 52 | 356 | 1 | 11 |
| 55 | 329 | 1 | 10 |
| 32 | 213 | 1 | 11 |
| 34 | 188 | 1 | 11 |
| 51 | 288 | 2 | 12 |

TABLE 1-continued

| | Matte Finish | | Gloss Finish | |
| --- | --- | --- | --- | --- |
| | Ra (μ-in) | Rz (μ-in) | Ra (μ-in) | Rz (μ-in) |
| | 34 | 195 | 2.5 | 12 |
| | 68 | 344 | 1 | 26 |
| | 46 | 224 | 1 | 10 |
| | 27 | 154 | 1 | 9 |
| | 48 | 266 | 1 | 11 |
| Ave | 46.3 | 268.5 | 1.3 | 12.4 |
| Stdev | 10.7 | 64.1 | 0.5 | 4.6 |

The film strips were compressed. Alcohol was then forced through the stack so that it flowed through the 0.010 inch dimension, between the 0.010 thick layers. The layers were stacked so that a matte finish side was compressed against a gloss finish side. The stacks were tested on a Bubble Point Tester, Model ABT-101A (Porous Materials, Inc., Ithaca, N.Y.). Dry bubble point result was 0.27 μm and 0.25 μm from two consecutive tests. Wet bubble point result was 0.21 μm and 0.21 μm from two consecutive tests.

The results indicate that the micron rating for the stack was 0.21 μm, which is within the desired range.

Example 2

Performance of another fit as described herein was tested. This test comprised of stacking round disks that were made from 250 μm (0.010 inch) thick film by 0.28 inches in diameter. A stack of seven disks were compressed with unknown force then laser welded on their outer edges so that they formed an integrated frit (bead running parallel to disk centerline, four equally spaced welds). Each disk was oriented so that the matte finish on one side was against a gloss finish side. Then a 0.050 center hole was drilled through six of the disks, leaving the end disc solid. Surface finish measurement of the film was the same as shown in Table 1 from Example 1, above. A nylon nut was then used to further compress the frit during bubblepoint testing. Alcohol was then forced through the center hole of the stack so that it flowed from the inside to the outside of the frit, between the disks. The frit was tested on Bubble Point Tester, Model ABT-101A (Porous Materials, Inc., Ithaca, N.Y.). This resulted in a bubblepoint rating of 0.16 μm when the nylon nut was manually tightened to a high torque value by hand, and a bubblepoint rating of 0.35 μm with a light torque value by hand. The results indicate that the micron rating for the frit was 0.35 μm, which is within the desired range. The housing was calibrated with a 5 μm OC-815-02 frit (IDEX Health & Science, Oak Harbor, Wash.). The bubblepoint test indicated a rating of 3.6 μm.

Example 3

Performance of another frit as described herein was tested. A stack of 14 laser cut disks were installed into a modified metering valve. The disks were cut from 0.003 inch (75 μm) thick film with a matte finish on one side and a gloss finish on the other side. The disks were cut to a 0.062 inch outside diameter and a 0.003 inch center hole was made. A nut on the metering valve provided the compression on the stack. With the nut set at a moderate finger tight torque value, the bubblepoint results were 1.63 μm, 1.76 μm, and 2.05 μm (visual observation value of 2.12 μm). When the nut was loosened by ¼ turn, the results were 6.62 μm and 6.75 μm.

This demonstrates that the compression on the stack effects the micron rating, which allows for the production of fits that have an adjustable micron rating. Another benefit is that the stack can be decompressed during back flush operations to allow the frit to be cleaned. The frit would then be compressed again to the appropriate micron rating.

While the present disclosure has been shown and described in various embodiments, those skilled in the art will appreciate from the drawings and the foregoing discussion that various changes, modifications, and variations may be made without departing from the spirit and scope of the invention as set forth in the claims. Hence the embodiments shown and described in the drawings, specific forms, materials, and the like, and the above discussion are merely illustrative and do not limit the scope of the invention as defined in the claims herein.

I claim:

1. A frit for use in a liquid chromatography system, the frit comprising:
   a first porous region surrounded by a second intermixed region surrounded by a third solid region, the second intermixed region being intermixed with solid portions and porous portions,
   wherein the first porous region, the second intermixed region, and the third solid region each comprise a polymer,
   wherein the third solid region comprises the polymer that has been heated and cooled, thereby forming the third solid region and the solid portions of the second intermixed region.

2. The frit according to claim 1, wherein the first porous region is shorter than the third solid region in the direction of fluid flow through the frit.

3. The frit according to claim 2, wherein the first porous region is between about 0.005 inches to about 0.03 inches shorter than the third solid region in the direction of fluid flow through the frit.

4. The frit according to claim 3, wherein the first porous region is about 0.01 inches shorter than the third solid region in the direction of fluid flow through the frit.

5. The frit according to claim 1, wherein said frit comprises a biocompatible material.

6. The frit according to claim 5, wherein said frit comprises polyetheretherketone.

7. The frit according to claim 1, wherein said frit has a thickness of between about 0.03 inches and about 0.1 inches.

8. The frit according to claim 1, wherein the third solid region is integral to the frit.

9. A method of making frits for use in a liquid chromatography system, comprising:
   a) placing a porous material into a press, wherein a first portion of the press comes into contact with a central portion of the porous material and a second portion of the press comes into contact with an outer portion of the porous material, and wherein the first portion of the press extends further than the second portion of the press;
   b) operating the press for at least a first time to compress the porous material, resulting in a central portion of the porous material that is shorter than the outer portion of the porous material;
   c) further pressing the outer portion of the porous material to increase the density of the outer portion of the porous material; and
   d) heating the outer portion of the porous material to solidify the porous material in the outer portion, thereby creating a frit comprising a porous central portion and a solid outer portion, wherein the porous central portion is shorter than the solid outer portion in a direction of fluid flow through the frit.

10. The method according to claim 9, wherein the porous material comprises a biocompatible material.

11. The method according to claim 9, wherein the porous material comprises polyetheretherketone.

12. The method according to claim 9, further comprising the step of introducing a flow of a gas or liquid through at least a portion of the central portion.

13. A frit made according to the method of claim 9, wherein the outer solid portion comprises a polymer that has melted and solidified thereby forming an intermixed area comprising solid portions and porous portions between the solid outer portion and the porous central portion.

14. A frit for use in a liquid chromatography system, the frit comprising:
   a central porous region having a first outer surface and a second outer surface at respective opposing outer faces of the frit;
   an intermixed region surrounding the central porous region; and
   an outer solid region surrounding the intermixed region, wherein the outer solid region has a third outer surface and a fourth outer surface at the respective opposing outer faces of the frit and comprises a polymer that has melted and solidified thereby forming the intermixed region comprising solid portions and porous portions.

15. The frit according to claim 14, wherein the central porous region is shorter than the outer solid region in a direction of fluid flow through the frit.

16. The frit according to claim 14, wherein the central porous region is between about 0.005 inches to about 0.03 inches shorter than the outer solid region in the direction of fluid flow through the frit.

17. The frit according to claim 14, wherein the central porous region is about 0.01 inches shorter than the outer solid region in the direction of fluid flow through the frit.

18. The frit according to claim 14, wherein said frit comprises a biocompatible material.

19. The frit according to claim 14, wherein said frit comprises polyetheretherketone.

* * * * *